(12) United States Patent
Weiss (10) Patent No.: US 9,592,567 B2
(45) Date of Patent: Mar. 14, 2017

(54) WELDING HEAD COMPRISING A MOVABLE ELECTRODE AND RELATED WELDING METHOD

(76) Inventor: Daniel Weiss, Herbertingen (DE)

( * ) Notice: Subject to any disclaimer, the term of this patent is extended or adjusted under 35 U.S.C. 154(b) by 37 days.

(21) Appl. No.: 13/978,281

(22) PCT Filed: Jan. 12, 2012

(86) PCT No.: PCT/DE2012/000022
§ 371 (c)(1),
(2), (4) Date: Jul. 31, 2013

(87) PCT Pub. No.: WO2012/095103
PCT Pub. Date: Jul. 19, 2012

(65) Prior Publication Data
US 2013/0327755 A1     Dec. 12, 2013

(30) Foreign Application Priority Data

Jan. 13, 2011 (DE) .................. 10 2011 008 515
Apr. 4, 2011 (DE) .................. 10 2011 016 026

(51) Int. Cl.
*B23K 9/14* (2006.01)
*B23K 9/02* (2006.01)
*B23K 9/167* (2006.01)

(52) U.S. Cl.
CPC .............. *B23K 9/14* (2013.01); *B23K 9/0216* (2013.01); *B23K 9/167* (2013.01)

(58) Field of Classification Search
CPC . B23K 9/167; B23K 9/28; B23K 9/00; B23K 9/16; B23K 9/24; B23K 35/38
See application file for complete search history.

(56) References Cited

U.S. PATENT DOCUMENTS

| 3,182,178 A | 5/1965 | Libby |
| 3,396,263 A | 8/1968 | Even et al. |

(Continued)

FOREIGN PATENT DOCUMENTS

| AT | 504253 B1 | 6/2008 |
| CN | 1064635 A | 9/1992 |

(Continued)

OTHER PUBLICATIONS

English translation of the International Search Report on Patentability in the PCT application PCT/DE2012/000022.

(Continued)

*Primary Examiner* — Brian Jennison
(74) *Attorney, Agent, or Firm* — Warner Norcross & Judd LLP (57) ABSTRACT

The invention relates to a welding head (1) comprising a heat-resistant electrode (2) for carrying out TIG welding operations on workpieces, in which the electrode (2) is movably mounted and can also be caused to move by a device (20). The electrode (2) preferably carries out either a rotating movement about the axis (A) thereof or an oscillating movement about said axis. During a preferably manual welding operation, undesired alloying-up is thus excluded during accidental contact between the electrode (2) and the workpiece to be welded. Moreover, repeated adhesion of liquefied welding filler material to the electrode (2) can be substantially prevented in the event that a welding filler material is supplied. With welding heads (1) which are cooled by means of a fluid circuit, said circuit, in cooperation with a turbine, can also be used to drive a rotating electrode (2). The movable electrode (2) can be connected to the voltage source thereof either via a sliding contact or via an electrically conducting liquid surrounding the electrode (Continued)

(2). The invention further relates to a method in which the welding head (1) according to the invention is used.

7 Claims, 5 Drawing Sheets

(56) References Cited

U.S. PATENT DOCUMENTS

| | | | |
|---|---|---|---|
| 3,485,999 A * | 12/1969 | Stevens et al. | 219/60 A |
| 4,455,471 A | 6/1984 | Ecer et al. | |
| 4,837,420 A | 6/1989 | Niinivaara | |
| 5,155,405 A | 10/1992 | D Aniello | |
| 5,448,035 A * | 9/1995 | Thutt | B26B 9/00 |
| | | | 219/76.13 |
| 5,965,037 A * | 10/1999 | Bernuchon et al. | 219/75 |

FOREIGN PATENT DOCUMENTS

| | | |
|---|---|---|
| DE | 1565627 B1 | 6/1971 |
| DE | 8405922 U1 | 9/1984 |
| DE | 69706508 T2 | 5/2002 |
| EP | 0849025 A1 | 6/1998 |
| JP | 55057378 A | 4/1980 |
| JP | 06015455 A | 1/1994 |
| JP | 07040053 A | 10/1995 |
| JP | 7314138 A | 12/1995 |
| JP | 0952178 | 2/1997 |
| JP | 0952178 A | 2/1997 |
| JP | 09192841 | 7/1997 |
| JP | 09192841 A | 7/1997 |
| JP | 10193120 | 7/1998 |
| SU | 437586 A | 7/1974 |
| SU | 1031693 A | 7/1983 |
| WO | 2006036408 A1 | 4/2006 |

OTHER PUBLICATIONS

International Search Report and Written Opinion for PCT Application PCT/DE2012/000022.
WIG—Schweißen (acknowledged prior art).
"Eine nur grob geordnete Bilderfolge der Aluriver-Baustelle (Stand 061121)" (Admitted prior art).
"EWM/Hightec Welding Betriebsanleitung Schweissgerate zum WIG- und E-Hand-Schweissen" (2009).
"Einfach WIG perfekt" (Zwickauer Schweisstechnik GMBH) (Admitted prior art).
Chinese Search Report from Chinese Patent Application No. 201280005371.8 dated Jul. 7, 2015.
W. Bergman, "Verarbeitung metallischer werkstoffe", pp. 156 and 174 (© 2002 Carl Hanser Verlag).
"Merkblatt für das WIG-Schweißen" (Undated, Acknowledged Prior Art).

* cited by examiner

WELDING HEAD COMPRISING A MOVABLE ELECTRODE AND RELATED WELDING METHOD

The invention relates to a welding head.

The use of such welding heads in so-called TIG welding apparatuses is known, for example, from the 1$^{st}$ edition, 2006, of "Wolfram-Intergasschweissen" of the DVS Verlag (Deutscher Verband für Schweissen and verwandte Verfahren e.V.). When welding with such welding apparatuses an arc is produced, starting from an electrode connected to a voltage source, which arc ends on the workpiece to be welded, that acts as an electrical mass. In such welding operations an additive substance can be supplied from the outside as required or the so-called melt bath alone can be produced from the material of the workpiece. The ignition of the arc can take place either by so-called contact ignition or by high-frequency ignition, whereby in the first instance a mechanical contact is briefly established between the electrode and in the second instance a high frequency is placed between the electrode and the workpiece.

When welding with such welding heads there is always the danger given the case that they are guided manually that upon an unintended mechanical contact during the welding operation a so-called alloying up of the electrode occurs, that is, that the electrode is welded unintentionally with the workpiece. This is particularly the case with inexperienced personnel and given a difficultly accessible welding connection on complex workpieces but absolutely also occurs occasionally in the case of an experienced hand.

After an alloying up the electrode must be separated from the workpiece again. During the separating procedure a piece of the electrode tip breaks off as a rule due to the material properties of tungsten and remains as a material inclusion connected to the workpiece. Such material inclusions require expensive grinding and similar subsequent improvement work or can even result in rejected material if the subsequent operations are too expensive or if they can no longer meet the mechanical requirements put on the workpiece.

In addition, in the case of workpieces consisting of expensive, corrosion-resistant alloys such material inclusions can be the starting point for corrosion phenomena. Furthermore, a subsequent grinding of the electrode into a reusable form becomes necessary.

This results in a high additional cost factor, on the one hand due to the enormous time loss on account of the subsequent working on the welding connection as well as on the electrode and on the other hand due to the material wear on the electrode and on grinding material or similar working material.

The previously described disadvantages can be prevented in a few hand-guided welding operations using a device for guiding and preventing an approach of the welding head to the workpiece to be worked. This is only worthwhile as a rule for reasons of cost if the same welding operations are concerned. Furthermore, the use of such devices is not always possible for reasons of space.

In order to mitigate somewhat the previously described disadvantages in particular in the case of rather high welding currents, the welding current is automatically reduced in the so-called TCS (TIG-Comfort Stop) welding when the electrode is approached to the workpiece. As a consequence, the damage to the electrode in the workpiece connected with an alloying up become somewhat less.

The invention therefore had the task of creating a welding head in which an alloying up of the electrode on the workpiece can no longer occur even given a direct mechanical contacting, and furthermore the settling of drops of welding material on the electrode is largely prevented.

These two tasks are solved by the present invention.

As a result of the movable support of the electrode and due to its movement made by the device, almost no more wear occurs on the electrode even in the case of a contacting between the electrode and the workpiece. Furthermore, also no more inclusion of electrode material into the workpiece occurs. A subsequent grinding of the electrode after contact with the workpiece is therefore only necessary again at the earliest after multiple contacts.

As a result, considerable time and therefore also expense can be saved and more rapid progress make during hand-guided welding since a contacting of the electrode with the workpiece does not necessarily lead to an interruption of the work. Furthermore, even more complicated welding operations can be carried out by less-experienced persons, which can also save expenses.

The additional advantage results in comparison to stationary welding electrodes for the case that additional welding material is supplied for carrying out the welding procedure that the drop-like adhering of liquefied welding material on the welding material that constantly reoccurs occurs significantly less frequently with the welding electrode in accordance with the invention on account of its movement.

The frequently apparent deformation of the arc away from the desired cone-shaped and focused shape associated with such an adhesion, with the consequence of a more or less great deviation from the desired welding image, and, given correspondingly great drops, a defective welding connection or even an unsuccessful welding attempt is thus often avoided.

Consequently, the welding head in accordance with the invention can be advantageously used not only for the case that it is guided manually but rather it can also be advantageously used—for the case when welding material is being supplied—in such welding operations in which the welding head is, for example, controlled in a spatially precise manner by a robot. In this case there is as a rule no more danger of an unintended contacting of electrode and workpiece and there is still the advantage that as a result of the movement of the welding electrode in accordance with the invention an adhering of tear-shaped, liquefied welding material and the associated deterioration of the welding image clearly occurs less frequently.

An embodiment of the invention has the advantage that there can be no danger of injury from welding heads placed again and again to the side during the welding operations. Furthermore, the device for moving the electrode can also have a longer service life since it is always put in operation only when actually required. Moreover, even a certain amount of energy can also be saved in this manner.

A further development has the additional advantage that the person carrying out the welding operations does not have to pay attention to the cutting in of the device for moving the electrode. Furthermore, the construction of the electric/electronic switching elements of the welding head (not shown) is simplified since the start-up of the device and the starting of the gas flow can be controlled with the same cutting-in signal.

In another development, the mobility of the electrode can be realized with relatively simple means.

Moreover, upon a rotation the stability of the arc is very largely ensured. In agreement therewith, traction tests on workpieces welded to each other showed that their tensile strength after they are welded with the welding head of the invention does not significantly differ from the tensile strength of compounds that were welded in accordance with the state of the art and therefore also fulfill their function. Furthermore, the adherence of tear-shaped, liquefied welding material on the welding electrode and the associated deterioration of the welding image are practically completely avoided in the case in which the welding material is applied from the outside, given the appropriate selection of the speed of rotation.

If the welding electrode is allowed to execute an oscillating motion, the transfer of the welding current onto the welding electrode becomes especially simple since on account of its limited movement course a fixed cable connection for transferring the welding current onto the electrode is still sufficient. Furthermore, as a result of the direct cable connection, power losses between voltage supply and electrode are avoided.

An embodiment of the invention has the advantage that the electrode is supported with as little friction as possible, as a result of which on the one hand wear phenomena of the device are minimized and on the other hand as a consequence the power requirements for moving the electrode become as small as possible.

In another development, a mechanical coupling between electrode and casing that can be constructively readily realized results, which coupling can also be readily loosened and reestablished in the case of an exchanging of the electrode. An advantage of a further development of the invention is that it represents a constructively simple structural form of the tightening device that can be economically produced. The transfer of the welding current onto the movable electrode always offers a good contacting of the casing by the automatic readjusting of the carbon brush carried out by the spring until it is almost completely worn down. In addition, this embodiment has the advantage of a low electrical transitional resistance and low friction losses during its rotation.

A further development of the invention has the advantage that such carbon brushes have a comparatively high conductivity so that sufficiently low transitional resistances are achieved even with carbon brushes that are built to be comparatively small.

In a further development of the invention, then an almost wear-free contacting of the electrode with its voltage supply results in addition to a very low transitional resistance.

In a further development, the advantage results that the rotation respectively oscillation is maintained, even given a mechanical contact between the workpiece and the electrode, against the associated, increasing forces of friction in that the direct current electromotor appropriately raises its power consumption up to its power limit.

The advantage of an embodiment of the invention consists in that the drive shaft of the direct current electromotor and the shaft of the rotation of the casing can be arranged spatially as desired relative to one another, which makes possible fairly large constructive freedoms in the designing of the welding head.

Furthermore, this embodiment of the invention allows a relatively simple replacement of the casing when the latter has become worn out in the course of time due to the relatively large currents transferred to it by the carbon brush and due to the occurring friction. Furthermore, any desired translation can be selected by means of a gear connection and therefore an optimal adaptation to the particular selected direct current electromotor can be achieved.

In a further development, the advantage results that the welding head can be kept in a relatively slim construction form and therefore welding operations in a constricted environment can be more readily carried out. Furthermore, this embodiment constitutes an economical solution for the drive of the casing.

A further development has an advantageous effect in particular on the service life of the carbon brush as well as of the direct current electromotor. It is not only ensured that the speed of the direct current electromotor is sufficiently high for preventing an alloying up even given a maximum welding current but the speed always follows the welding current again as far as possible downward.

In a further development, the advantage results that turbines can achieve relatively high drive performances with a relatively small installation size at the same time, as a result of which a relatively compact construction size of the welding head can be achieved. The fluid circulation, which is necessary in any case in most instances for cooling the welding head and is maintained by the welding apparatus also advantageously ensures the drive of the turbine. Since no additional electrical lines are required, the welding head of the invention can therefore also be retrofitted in a quite simple manner in welding apparatuses that were originally designed only for welding heads in accordance with the prior art.

In a retrofitting the welding head in accordance with the invention is simply connected as in the prior art to the inlet and the outlet of the fluid that start from the welding apparatus while the fluid is conducted to and from the turbine inside the welding head of the invention as needed.

A further development of the invention still has the advantage of a compact structural form of the welding head and is furthermore distinguished in that only a few other structural parts, that are also economical at the same time, are required in comparison to welding heads in accordance with the prior art.

Starting from the cited advantages of the previously mentioned embodiments of the invention that are all based on the principle of the mobility of the electrode, a transfer of this principle to other welding methods is also offered, in particular to the manual arc welding and the so-called MSG (Metal Protection Gas) welding method (comparisons to both methods Wikipedia.org/welding).

In the first instance a movement of the rod electrode melting during the welding process would prevent an alloying up primarily before the welding process with the current source already being cut in, in particular during ignition and immediately after the welding process with the current source still cut in.

In the second instance an application of this principle for the mechanical reversal—that is, a movement of the so-called welding jet guiding the tracked welding wire around or along the axis of the welded wire—would prevent that in the case of an undesired so-called burning back of the welding wire to the welding jet the welding wire would not alloy up on the welding jet.

Five exemplary embodiments of the invention are described in the following using FIGS. 1-7, in which.

Figure 1:
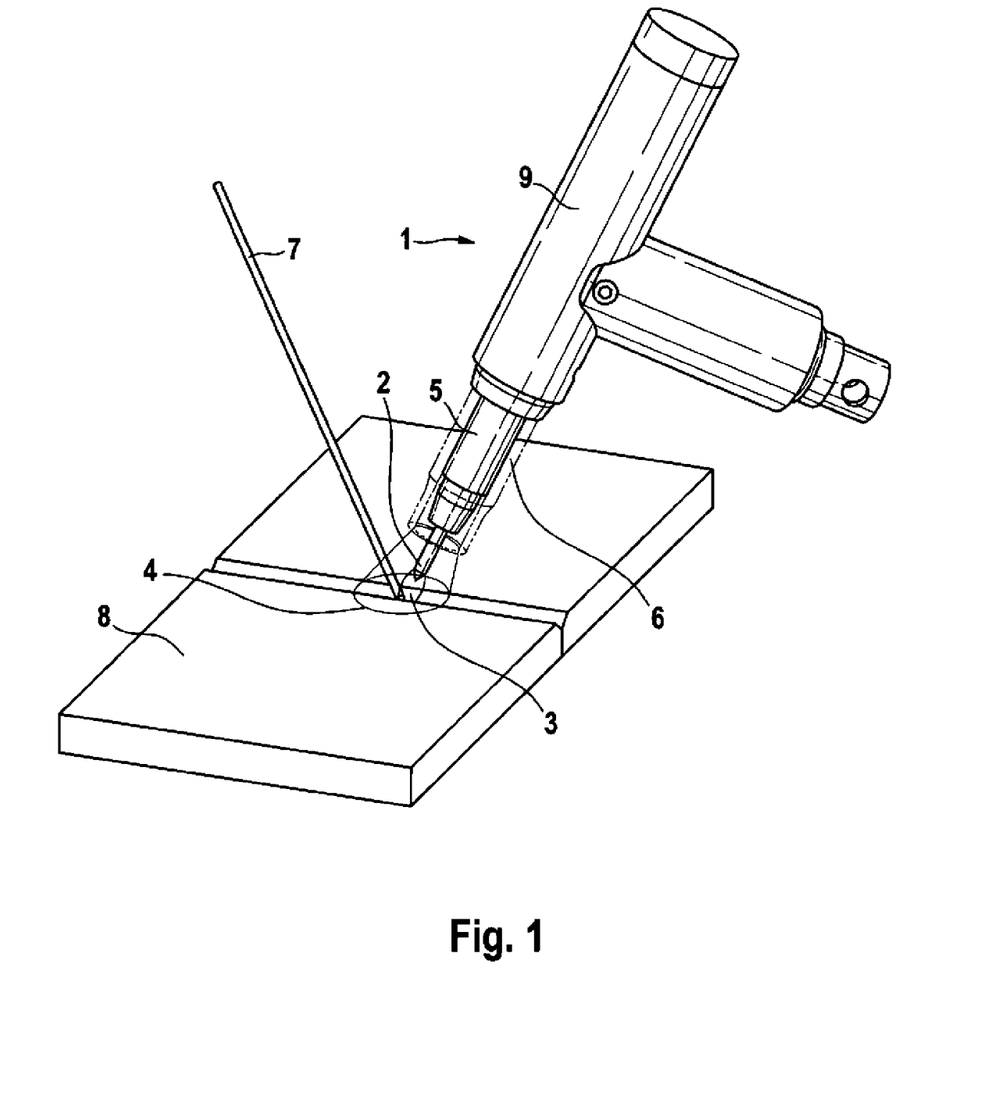
FIG. 1 shows a view of a process of the welding operation in which the welding head of the invention is used.

FIG. 1 shows a basic view of the so-called TIG (Tungsten Inert Gas) welding process using the welding head (1) in accordance with the invention. The core piece of the welding head (1) is a non-melting, extremely temperature-resistant electrode (2). An arc (3) starting from the electrode (2) heats and liquefies the material of the workpiece (8) consisting at first of two separate parts that each consist, for example, of steel and are to be welded together. The ignition of the arc (3), can take place without contacting the workpiece (8) by the electrode (2). An electrical unit that is not shown and serves to this end comprises a high-voltage source that is briefly additionally connected to the permanent current source of the electrode (2) during the ignition process. The welding takes place with most workpieces with direct current but in the case of workpieces consisting of aluminum alternating current is used.

In the so-called V-butt joint shown in FIG. 1 additional welding material (7) is generally used that is customarily present in wire form. However, in many applications no additional welding material (7) is necessary. A gas jet (5) and a ceramic casing (6) are arranged around the electrode (2). The exiting gas flow (4) serves as a protective gas in that it protects the heated workpiece (8) from chemical reactions with the surrounding air and thus ensures the necessary strength and ductility of the welding connection. Various noble gases can serve as protective gases (7) and in most instances it is argon. All these protective gases (7) are slow to react, indicated by the professional designation "inert".

Figure 2:
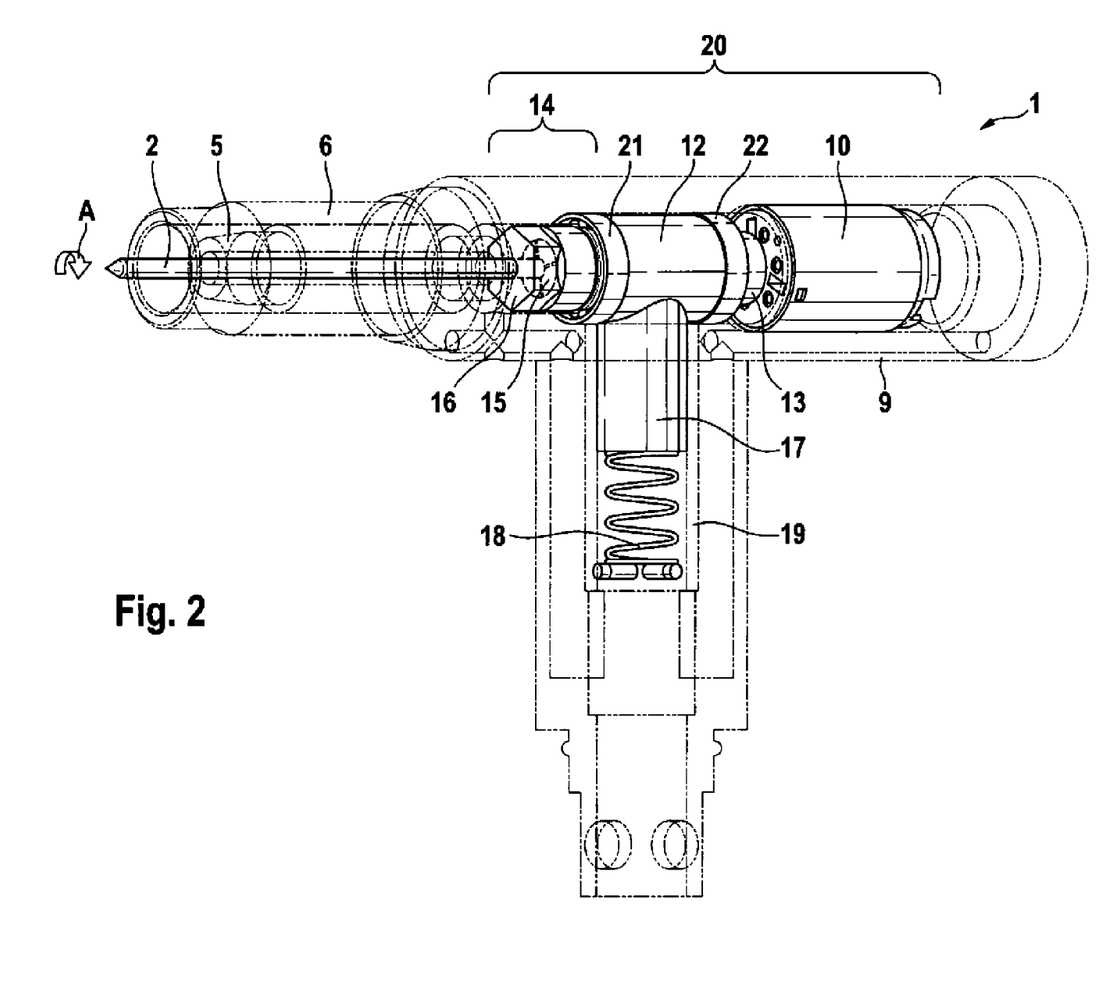
FIG. 2 shows a perspective lateral view of a first embodiment of the welding head of the invention, whose housing consists of transparent material and in which the casing is put in a rotary movement by a direct current electromotor whose drive shaft is arranged coaxially to the casing.
Figure 3:
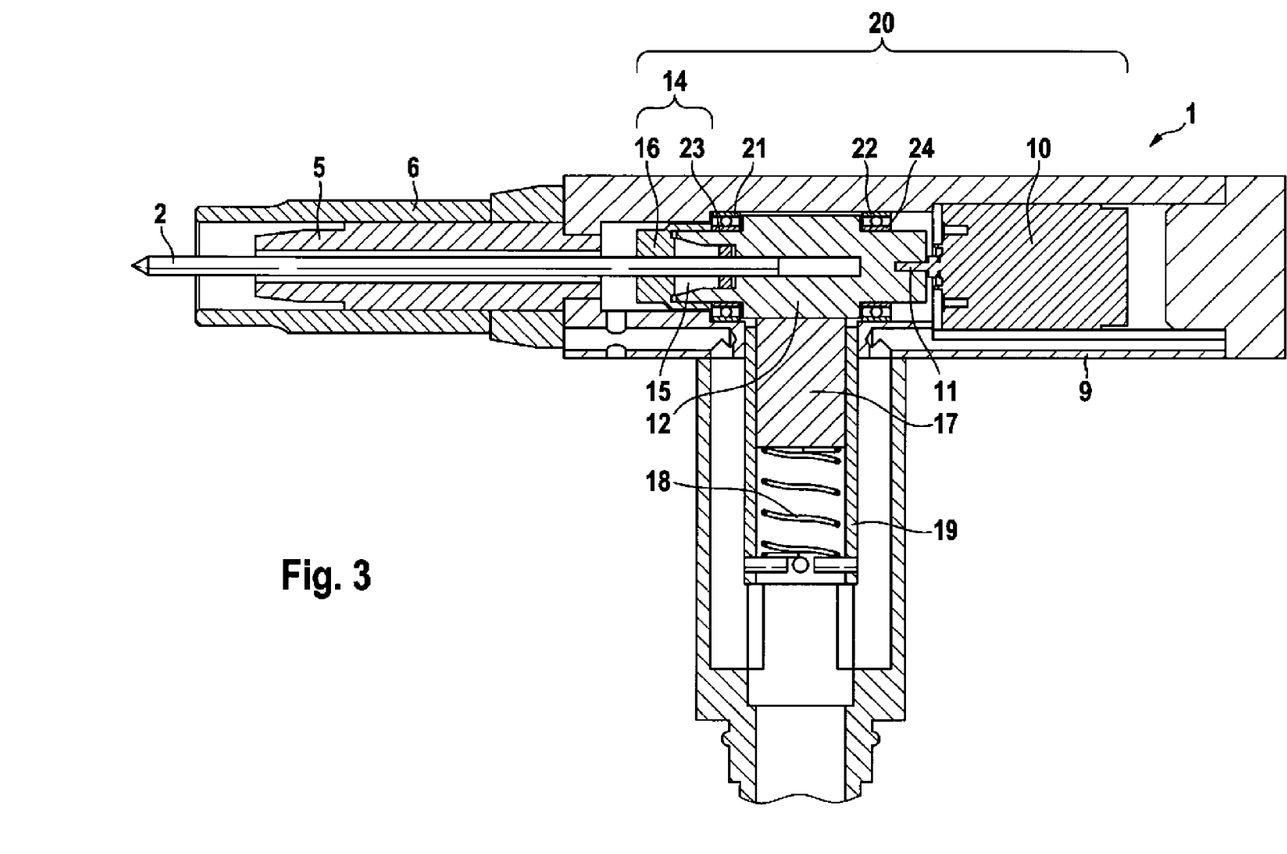
FIG. 3 shows a longitudinal section through the welding head of the invention in accordance with FIG. 2.

A first embodiment of the welding head (1) in accordance with the invention according to the FIGS. 2 and 3 has a transparent housing (9) and shows a coaxial arrangement of the shafts (A, 11) of the electrode (2) and of a direct current electromotor (10). The connection of the electrode (2) to its voltage supply takes place via a multi-wire copper line that is not shown and is electrically connected to a carbon brush (17) that for its part rests on a cylindrically formed copper casing (12) that can rotate about the same shaft and that therefore has a function analogous to that of the rotor of an electromotor. In order to maintain a constant contact of casing (12) and carbon brush (17) the latter is permanently pressed against the casing (12) by a counter-supported spiral spring (18) arranged in a guide casing (19), whereby the spiral spring (18) is secured for its part by three pins not provided with reference numerals.

A device (20) for rotating the electrode (2) comprises, among other things, a coupling (13) and a tightening device (14) that serve to establish a mechanically rigid connection of the shaft (11) of the direct current electromotor (10) to the electrode (2) via the casing (12). On the one hand the shaft (11) is permanently connected in a mechanically rigid manner via the coupling (13) to an end of the casing (12) and on the other hand the electrode is clamped in by the tightening device (14) at the other end of the casing (12).

The casing (12) itself is cylindrically constructed but has a greater cross section in its central area that contacts the carbon brush (17). Ball bearings are arranged on both sides of the greater cross section the outer rings (21, 22) of which bearings are fastened in the housing (9) and in whose inner rings (23, 24) the casing (12) is clamped.

In the simplest case the coupling (13) for the mechanically rigid connection between casing (12) and shaft (11) of the direct current electromotor (10) resting in the housing (9) can take place, for example, in that up to three threaded pins are screwed into the outer surface of the casing (12) that clamp the shaft (11) in in a centering manner in their cooperation.

The tightening device (14) for the mechanically rigid connection between the casing (12) and the otherwise freely rotating electrode (2) comprises a conical tightening insert (15) with four longitudinal slots and a precisely fitting bore for receiving the electrode (2). The outer surface of the tightening insert (15) is dimensioned in such a manner that it can be introduced sufficiently deep into the casing (12) but is then finally held centrally by the latter. Furthermore, the casing (12) has an outside thread that is not shown and onto which a tightening nut (16) can be screwed, as a result of which the electrode (2) is clamped sufficiently firmly in the tightening insert (15).

The electrode (2), that is firmly clamped in in this manner, rotates after the cutting in of the direct current electromotor (10) with its speed and the welding process can now begin without having to fear an undesired alloying up anymore. Care is to be taken that upon the selection of rather high welding currents the speed of the direct current electromotor (10) should also be raised in order to quite reliably prevent an alloying on even then.

It is ensured to a great extent by the direct current electromotor (10) that this necessary speed is maintained even if fluctuations of the friction in the ball bearings occur or the electrode (2) should grind on the workpiece (8).

Figure 4:
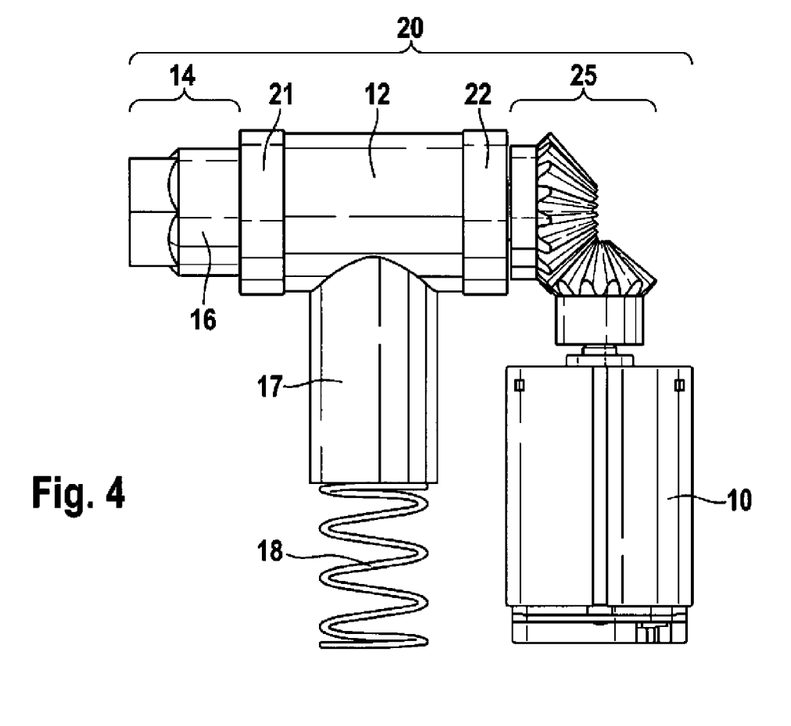
FIG. 4 shows a second embodiment of the welding head of the invention, whose housing is not shown and in which the casing and the drive shaft of the direct current electromotor are arranged spatially vertically to one another.

The second embodiment of the invention shown in FIG. 4 differs from the first embodiment by the manner of the coupling of the direct current electromotor (10) to the casing (12). In this instance there is no longer a coaxial arrangement between casing (12) and direct current electromotor (10) but rather the corresponding shafts stand vertically to one another. If, for example, a translation ratio of 1:1.5 is selected in this gear connection (25), the speed of the entire device (20) will be lower than that of the direct current electromotor (10).

This means that the entire device (20) rotates one third slower than the motor shaft (11) of the direct current electromotor (10), as a result of which the available torque on the electrode (2) is raised by a third.

In this manner it is ensured that the direct current electromotor (10) can largely maintain its speed to the extent possible in case the work piece (8) makes contact with the electrode (2) even at a higher contact pressure.

Figure 5:
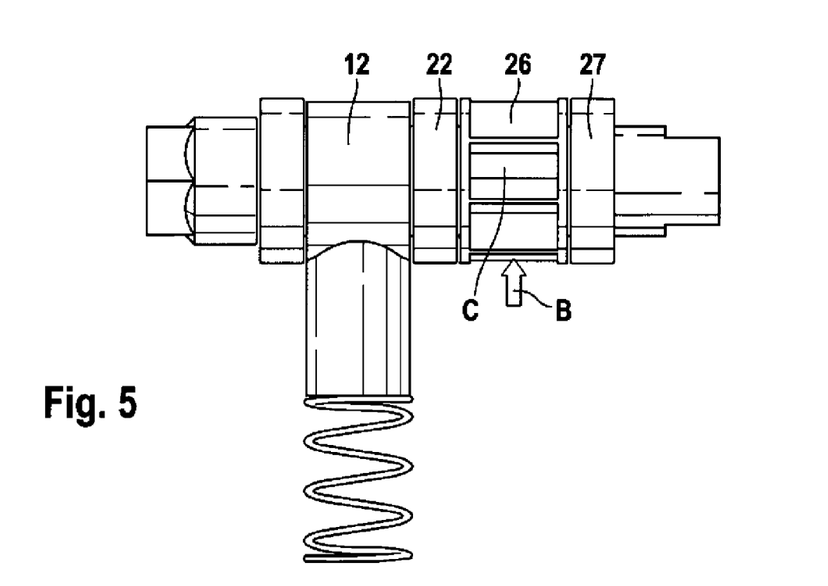
FIG. 5 shows a third embodiment of the welding head of the invention, whose housing is also not shown and in which the casing is driven by a coaxially arranged turbine.

The third embodiment of the invention shown in FIG. 5 has a further third outer support ring (27) fastened on the casing (12) which ring defines, together with the second outer support ring (22) adjacent to it, the work chamber (C) of a turbine (26) arranged coaxially to the casing (12) and shown only schematically. A current of cooling water starting from a welding apparatus (B) to the welding head (1) and back from it to the welding apparatus is also not shown. The original purpose of this current of cooling water is to avoid an overheating of the welding head (1) and in the present embodiment it furthermore also serves to drive the turbine (26) and therefore serves for the rotation of the electrode (2) connected to the latter.

Of course, aside from water even another cooling agent, for example, with an even higher heat capacity can be used with which the turbine can then be driven in the same manner.

Moreover, in the case of welding heads not cooled by a fluid, cooling can be achieved by the protective gas (4) that is flowing out in any case. If the protective gas (4) is also conducted again over the turbine (26) the latter can also be driven by the flow of the protective gas (4).

Of course, a separate fluid circuit for gas current circuit can also be generated in the welding apparatus for driving the turbine (26) that serves exclusively for driving the turbine (26) and not simultaneously for also cooling the welding head (1). This could take place, for example, by connecting the work chamber (C) of the turbine (26) to a compressed air system.

Figure 6:
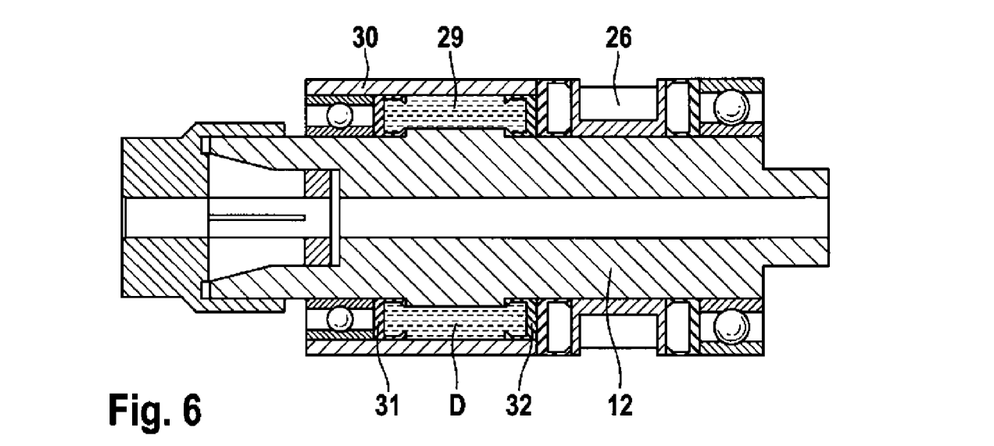
FIG. 6 shows a fourth embodiment, modified in comparison to FIG. 5, of the welding head of the invention in a sectional view along the shaft of the electrode, in which the transfer of the welding current onto the casing takes place by an electrically conductive liquid.

Instead of the contacting with the carbon brush (17), the casing (12) can also, as shown in FIG. 6, be allowed to rotate in a chamber (D) filled with an electrically conductive liquid (29) in order to keep it in electrical contact with the voltage supply. The chamber (D) is limited radially on one side by a stationary outer casing (30) consisting of metal and connected to the voltage supply and on the other side by the casing (12). In the axial direction it is sealed by two sealing rings (31, 32). Suitable electrically conductive liquids for this are, among others, gallium alloys containing indium and tin, for example, so-called galinstan with 68.5% gallium, 21.5% indium and 10% tin. This alloy is present in liquid form under a normal pressure between −19° C. and 1300° C. This type of transferring the welding current onto the casing (12) can naturally also be used if the casing (12) is not driven by a turbine (26) but rather, as shown in FIG. 2, by a direct current electromotor (10).

Figure 7:
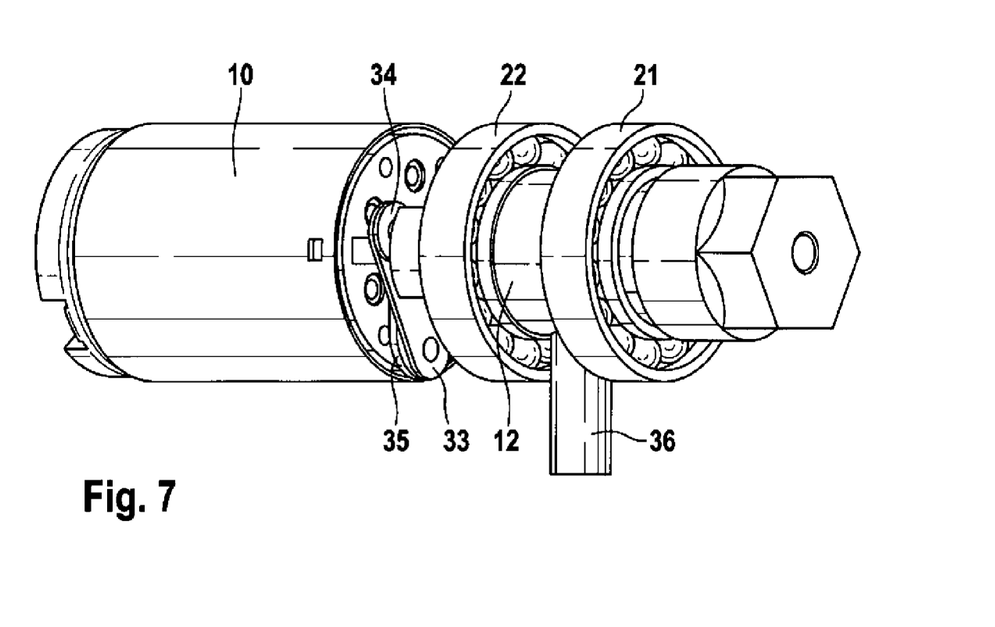
FIG. 7 shows a fifth embodiment of the welding head of the invention, whose housing is also not shown and in which the casing is put in an oscillating movement by a direct current electromotor via an eccentric.

In the embodiment shown in FIG. 7 the structural parts provided with the same reference numerals have the same function as in all previously described embodiments. The drive shaft (11) of the direct current electromotor (10) is, however, not directly connected to the casing (12) but rather by one of two connecting rods (33, 34) and an eccentric disk (35) coupled to the drive shaft (11).

As a result, the casing (12) is put in an oscillating movement during the rotation of the drive shaft (11), whose frequency is determined by the speed of the drive shaft (11) and whose amplitude is determined by the extent of the eccentric coupling.

The connection of the electrode (2) to its voltage supply takes place by a flexible line (36) whose end is permanently connected mechanically as well as electrically to the casing (12).

In all previously described embodiments the welding operation is initiated in a customary manner in that the welding head (1) is connected at first to its voltage source, that is not shown, and in the case of a hand-guided welding the person carrying out the welding operations manually initiates the supply of the gas flow (4) serving as protective gas. The direct current electromotor or the turbine (26) is automatically put in operation simultaneously with the supplying of protective gas (4). This ensures that the direct current electromotor (10) or the turbine (26) has reached its rated speed and the space between the electrode (2) and the work piece (8) is surrounded by protective gas before the actual welding operation begins. The same sequence in time of the supply of protective gas, the rotation of the electrode (2) on the one hand and the beginning of the welding operation on the other hand is also observed in welding operations controlled by robots.

| List of reference numerals: | |
|---|---|
| Number | Designation |
| 1 | Welding head |
| 2 | Electrode |
| 3 | Arc |
| 4 | Gas flow |
| 5 | Gas jet |
| 6 | Ceramic casing |
| 7 | Welding addition |
| 8 | Work piece |
| 9 | Housing |
| 10 | Direct current electromotor |
| 11 | Motor shaft |
| 12 | Casing |
| 13 | Coupling |
| 14 | Tightening device |
| 15 | Tightening insert |
| 16 | Tightening nut |
| 17 | Carbon brush |
| 18 | Pressure spring |
| 19 | Guide casing |
| 20 | Device |
| 21 | First outer support ring |
| 22 | Second outer support ring |
| 23 | First inner support ring |
| 24 | Second inner support ring |
| 25 | Gear connection |
| 26 | Turbine |
| 27 | Third outer support ring |
| 28 | chamber |
| 29 | Conductive liquid |
| 30 | Outer casing |
| 31 | Left sealing ring |
| 32 | Right sealing ring |
| 33 | Connecting rod motor |
| 34 | Connecting rod casing |
| 35 | Eccentric disk |
| 36 | Flexible line |

The invention claimed is:

1. A handheld welding head (1) comprising:
a handheld housing (8) adapted to be held by a human hand;
a heat-resistant electrode (2) supported by the handheld housing (8), the heat-resistant electrode (2) adapted to conduct a welding current, whereby a welding operation may be brought about by an arc (3) starting from the electrode (2) and running to a work piece (8) acting as electrical ground, the electrode (2) being rotatably supported within the handheld housing (8); and
a device (20) supported by the handheld housing (8) for at least one of rotating and oscillating the heat-resistant electrode (2), whereby, during a hand-guided welding operation using the handheld welding head (1), the rotation or oscillation of the heat-resistant electrode (2) prevents both (a) unintentional alloying up of the electrode (2) on the work piece (8) upon direct mechanical contact of the handheld welding head (1) with the work piece (8) and (b) fixing of drops of any provided welding material (7) on the electrode (2), the device (20) including an electromotor (10) connected to the heat-resistant electrode through a positive gear connection (25).

2. A handheld welding head (1) comprising:
a handheld housing (8) adapted to be held by a human hand;
a heat-resistant electrode (2) supported by the handheld housing (8), the heat-resistant electrode (2) adapted to conduct a welding current, whereby a welding operation may be brought about by an arc (3) starting from the electrode (2) and running to a work piece (8) acting as electrical ground, the electrode (2) being rotatably supported within the handheld housing (8);

a rotatable casing (12) supported by the handheld housing (8) and electrically connected to the heat-resistant electrode (2);

a brush (17) electrically engaging the rotatable casing (12);

a spring (18) engaging and pressing the brush (17) against the rotatable casing (12); and a device (20) supported by the handheld housing (8) for at least one of rotating and oscillating the heat-resistant electrode (2), whereby, during a hand-guided welding operation using the handheld welding head (1), the rotation or oscillation of the heat-resistant electrode (2) prevents both (a) unintentional alloying up of the electrode (2) on the work piece (8) upon direct mechanical contact of the handheld welding head (1) with the work piece (8) and (b) fixing of drops of any provided welding material (7) on the electrode (2), the device (20) including an electromotor (10) connected to the heat-resistant electrode, the axis of rotation of the heat-resistant electrode (2) and the axis of rotation of the electromotor (10) being transverse to one another.

3. The welding head (1) according to claim 2, characterized in that the axis of rotation of the heat-resistant electrode (2) and the axis of rotation of the electromotor (10) are perpendicular to one another.

4. The welding head (1) according to claim 2, characterized in that the brush (17) comprises a carbon brush including a material with a high bronze content.

5. The welding head (1) according to claim 1 or 2, characterized in that the electromotor comprises a direct current electromotor.

6. The welding head (1) according to claim 1, characterized in that the axis of rotation of the electromotor (10) is coaxial with the axis of rotation of the casing (12).

7. The welding head (1) according to claim 1 or 2, further comprising a control for increasing the speed of the electromotor (10) with increasing welding current, and lowering the speed of the electromotor with decreasing welding current.

* * * * *